United States Patent [19]

Harada et al.

[11] 4,324,875

[45] * Apr. 13, 1982

[54] METHOD FOR PRODUCING OLEFIN POLYMERS

[75] Inventors: Masato Harada, Kisarazushi; Sadahiko Yamada, Ichiharashi; Atsushi Suzuki, Ichiharashi; Jun Masuda, Ichiharashi, all of Japan

[73] Assignee: Chisso Corporation, Osaka, Japan

[*] Notice: The portion of the term of this patent subsequent to Apr. 7, 1998, has been disclaimed.

[21] Appl. No.: 151,795

[22] Filed: May 21, 1980

[30] Foreign Application Priority Data

Jun. 1, 1979 [JP] Japan .................................. 54/68294

[51] Int. Cl.$^3$ .......................... C08F 4/02; C08F 10/00
[52] U.S. Cl. ................................. 526/115; 252/429 B; 252/429 C; 526/97; 526/114; 526/116; 526/119; 526/121; 526/122; 526/124; 526/125; 526/348; 526/348.6; 526/351; 526/352
[58] Field of Search ................. 526/97, 114, 115, 116, 526/121, 122, 124, 125, 119

[56] References Cited

U.S. PATENT DOCUMENTS

| | | | |
|---|---|---|---|
| 3,987,233 | 10/1976 | Sato et al. | 526/119 |
| 4,109,071 | 8/1978 | Berger et al. | 526/114 |
| 4,154,701 | 5/1979 | Melquist | 526/116 |
| 4,180,636 | 12/1979 | Hirota et al. | 526/125 |
| 4,252,670 | 2/1981 | Count et al. | 526/125 |
| 4,260,723 | 4/1981 | Harada et al. | 526/114 |

FOREIGN PATENT DOCUMENTS

2925949 1/1980 Fed. Rep. of Germany ...... 526/124

*Primary Examiner*—Edward J. Smith
*Attorney, Agent, or Firm*—Fred Philpitt

[57] ABSTRACT

A method for producing α-olefin polymers or copolymers by the use of an improved catalyst consisting of a combination of an organoaluminum compound with a specified solid product (III) which is produced by reacting a trivalent metal halide with a divalent metal hydroxide, oxide, carbonate, or a composite compound containing the foregoing compound(s) or a hydrate of a compound containing a divalent metal; reacting the resultant solid product (I) with a transition metal compound in the presence of an electron donor to produce a solid product (II); and further reacting said solid product (II) with a halogen-containing transition metal compound and a halogen-free transition metal compound.

2 Claims, No Drawings

METHOD FOR PRODUCING OLEFIN POLYMERS

BACKGROUND OF THE INVENTION

The present invention relates to a method for producing olefin polymers by using a novel catalyst for polymerizing olefins.

Field of the Invention

Olefin polymerization or olefin polymers referred to in the present invention mean homopolymerization or homopolymers of α-olefins, and further include copolymerization or copolymers of α-olefins with a small amount of other α-olefins copolymerizable therewith (including diolefins).

Description of the Prior Art

As for catalysts for polymerizing α-olefins such as ethylene, it has heretofore been known that a catalyst obtained by fixing a transition metal compound onto the surface of a magnesium compound such as magnesium chloride, magnesium hydroxide, magnesium oxide, etc. and then combining the resulting material with an organoaluminum compound is employed for the above-mentioned catalysts. In recent years, as for olefin polymers suitable for the fields of extrusion molding and blow molding, it has been particularly required that such polymers have higher molecular weights (lower melt indexes) and also a superior fluidity at the time of molding. In such a situation, for the above-mentioned Ziegler catalysts, it is possible to improve the fluidity to a certain extent, for example, by combining a component of a catalyst supported on a carrier with mixed organoaluminum compounds or by blending olefin polymers having notably different molecular weights together, but the resulting polymers have been not satisfactory for practical uses.

As for a method for improving the fluidity, a means of broadening the molecular weight distribution has been employed. Olefin polymers having narrower molecular weight distributions are suitable for injection molding or the like, whereas it is preferable for polymers employed for extrusion molding or blow molding or for stretching purpose to have broader molecular weight distributions. If polymers having narrower molecular weight distributions are employed for blow molding or the like, extrusion pressure at the time of molding increases to such an extent that the molding becomes infeasible, and appearance of the resulting molded products are extremely injured by creation of streaks as well as creeping and blobbing and further, melt fracture. In the case of extrusion molding, the resulting product suffers from fatal bad influence by too much rise of extrusion pressure, reduction of stability of molding etc., thus leading to a remarkable drop of its commodity value. Thus, in order to overcome these drawbacks, it is necessary to broaden the molecular weight distribution of polymers thereby to improve their fluidity at the time of molding, to improve productivity of molding and processing, to provide products having a superior appearance and further, to make it possible to carry out complicated molding and fabrication currently required.

The inventors of the present application formerly found that a further improvement can be obtained by selecting two kinds of transition metal compounds from among two specified groups as transition metal compounds and using, as a solid product to be reacted therewith, the one which has been subjected to a specified reaction, during the course of the preparation of catalyst components, and invented a method for producing olefin polymers which is characterized in the use of a solid product which is obtained by reacting a transition metal compound with a solid product (I) in the presence of a polysiloxane and reacting the resultant solid product (II') with a halogen-containing transition metal compound and a halogen-free transition metal compound. (Refer to Japanese patent application Nos. 77777 of 1978 and 85419 of 1978). In these prior applications, the use of polysiloxane at the time of production of the solid product (II') from the solid product (I) is the essential constituting element, but the inventors of the present invention continued their research further and have found that even in case of the use of the solid product (II) produced by reacting with a solid product (I) a transition metal compound in the presence of an electron donor which is different from polysiloxane, in place of the polysiloxane, the same effectiveness can be obtained.

SUMMARY OF THE INVENTION

The present invention resides in a method for producing α-olefin polymers which is characterized in the use of a catalyst obtained by combining a solid product (III) with an organoaluminum compound, said solid product (III) being obtained by:

mixing and reacting a trivalent metal halide with a divalent metal hydroxide, oxide, carbonate or a composite compound containing the foregoing compound(s), or a hydrate of a compound containing a divalent metal (these being hereinafter referred collectively to as a divalent metal compound) in an atom ratio of the divalent metal to the trivalent metal of 0.1 to 20 to produce a solid product (I):

reacting 100 g of this solid product (I) with 1 to 1,000 g of a compound of a transition metal of 4a group or 5a group of the Periodical Table in the presence of 10 to 10,000 g of an electron donor in a proportion of 2 to 2,000 g of said compound of transition metal relative to 100 g of said electron donor to produce a solid product (II); and further reacting 100 g of this solid product (II) with at least one member selected from a group (A) consisting of halogen-containing compounds of transition metals of 4a group or 5a group of the Table (abbreviated to (A)-TMC) and at least one member selected from a group (B) consisting of halogen-free compounds of transition metals of 4a group or 5a group of the Table (abbreviated to (B)-TMC) in a ratio of the number of the transition metal atoms of (A)-TMC to that of (B)-TMC of 10/1 to 1/10 and in the total weight of (A)-TMC and (B)-TMC of 1 to 1,000 g to produce said solid product (III).

DESCRIPTION OF THE PREFERRED EMBODIMENTS

It has been known to use a combination of a halogen-containing transition metal compound (e.g. $TiCl_4$) and a polytianic acid ester (one kind of halogen-free transition metal compounds) during the course of preparation of a catalyst for polymerizing olefins. For example, Japanese patent application laid-open No. 100984/1976 discloses a catalyst obtained by combining a solid product obtained by reacting a polytitanic acid ester with a halogenating agent (including $TiCl_4$) and having no carrier as an indispensable constituting element, with an organoaluminum compound.

However, polymerization activity and molecular weight distribution comparable to those of the polymers obtained in the present invention could not have been obtained.

Further, Japanese patent application laid-open No. 24292/1977 discloses a catalyst obtained by combining a solid product obtained in the same manner as in said Japanese patent application laid-open No. 100984/1976, with an organometallic compound, in the coexistence of a magnesium compound supporting a transition metal compound. In the above invention, polytitanic acid ester or polytitanic acid ester having been reacted with a halogenating agent such as $TiCl_4$ is not reacted with an magnesium compound during the course of preparation of catalyst.

This invention is characterized as follows:

It is an indispensable condition to react a halogen-containing transition metal compound and a halogen-free transition metal compound, with a solid product (II), in advance of combining both the compounds with an organoaluminum compound.

Further it is also an indispensable condition that the solid product (II) is obtained by reacting, in the presence of an electron donor, a transition metal compound with a solid product (I) obtained by reacting a trivalent metal halide with a divalent metal compound, and is by itself a material different from the magnesium compound indicated in the Japanese patent application laid-open No. 24292/1977, and further, as for the transition metal compound to be reacted with the solid product (II), a halogen-containing transition metal compound and a halogen-free transition metal compound are both used.

The materials which are used as a solid product (II) in the present invention, are those which have been by themselves combined as a solid catalyst component, with an organoaluminum compound and used for $\alpha$-olefin polymerization (refer to Japanese patent application No. 55757 of 1978 whose inventors are the same as the present ones). In that case, there is obtained an olefin polymer having a high polymerization activity and a high bulk density but a narrow molecular weight distribution. However, the materials obtained by reacting the solid product (II) with two specified kinds of transition metal compounds exhibit an effectiveness of broadening the width of molecular weight distribution of polymer when they are used as a solid catalyst component.

The present invention will be described in more detail.

As for the trivalent metal halide, aluminum trichloride (anhydrous) and ferric chloride (anhydrous) are mentioned.

As for the divalent metal compound, for example, hydroxides such as $Mg(OH)_2$, $Ca(OH)_2$, $Ba(OH)_2$, $Zn(OH)_2$, $Mn(OH)_2$, $Fe(OH)_2$, $Co(OH)_2$, $Ni(OH)_2$; oxides such as MgO, CaO, BaO, ZnO, MnO, FeO; composite oxides containing a divalent metal oxide such as $MgAl_2O_4$, $Mg_2SiO_4$, $Mg_6MnO_8$; carbonates such as $MgCO_3$, $CaCO_3$, $BaCO_3$, $MnCO_3$; hydrates of halides such as $SnCl_2.2H_2O$, $MgCl_2.6H_2O$, $NiCl_2.6H_2O$, $MnCl_2.4H_2O$, $KMgCl_3.6H_2O$; hydrates of composite compounds consisting of an oxide and a halide such as $3MgO.MgCl_2.4H_2O$; hydrates of composite oxides containing a divalent metal oxide such as $3MgO.2SiO_2.2H_2O$; hydrates of composite compounds consisting of a carbonate and a hydroxide such as $3MgCO_3.Mg(OH)_2.3H_2O$; hydrates of hydroxide-carbonate containing a divalent metal; $Mg_6Al_2(OH)_{16}CO_3.4H_2O$; etc. are mentioned.

For reacting a trivalent metal halide with a divalent metal compound, it is preferable to admix and mill them together in advance in a ball mill for 5–100 hours or in a vibrating mill for 1–10 hours to bring them into a sufficiently mixed state. As for the mixing ration, usually the range of 0.1 to 20 in terms of the atomic ratio of divalent metal to trivalent metal may be sufficient, and a preferable range is 1–10. The reaction temperature is usually 20°–500° C., preferably 50°–300° C. As for the reaction time, 30 minutes–50 hours may be sufficient. When a reaction temperature is lower, reaction is carried out for a long time so as not to leave unreacted trivalent metal compund. A solid product thus obtained will be referred to as a solid product (I).

Then a transition metal compound is reacted with a solid product (I) in the presence of an electron donor. This reaction and subsequent ones will be carried out in general all under the atmosphere of an inert gas such as nitrogen.

As an electron donor, oxygen-containing electron donors, such as ethers (R—O—R'), esters ($RCO_2R'$), aldehydes (RCHO), ketones (RCOR'), carboxylic acids ($RCO_2H$), acid anhydrides (R—$CO_2CO$—R'), acid amides ($RCONH_2$), nitrogen-containing electron donors such as amines ($R_nNH_{3-n}$, $n=1\sim3$), nitriles (RCN), phosphorus-containing electron donors such as phosphines ($R_nPR'_{3-n}$, $n=1\sim3$), phosphorus oxytrichloride ($POCl_3$), sulfur-containing electron donors such as thioethers ($R_nSR'_{2-n}$, $n=1\sim2$) are useful. These electron donors can be used not only alone but also as a mixture of two or more. These electron donors can be used in admixture with polysiloxane.

In each of the above-mentioned general formulae, R and R' are hydrocarbon group, more particularly, aliphatic hydrocarbon group having 1–50 carbon atoms, including unsaturated hydrocarbon group, unsubstituted monocyclic hydrocarbon group, substituted monocyclic hydrocarbon group, condensed polycyclic hydrocarbon group, etc. Aliphatic hydrocarbon groups include, as examples of straight chain, methyl, ethyl, propyl, butyl, pentyl, hexyl, octyl, etc., as examples of branched chain, isopropyl, isobutyl, isopentyl, isohexyl, isooctyl, 2-methyl-pentyl, 3-methyl-pentyl, 5-methyl-hexyl, etc. Unsaturated hydrocarbon groups include alkenyl group and alkadienyl group, including not only the one having terminal unsaturated bond but also the one having unsaturated bond in the inside, e.g. vinyl, allyl, isopropenyl, 1-propenyl, 2-butenyl, 1,3-butadienyl, etc. Monocyclic hydrocarbon groups include alicyclic and aromatic hydrocarbon groups. As examples of those having no substituent, there are alicyclic hydrocarbon groups such as cyclopropyl, cyclohexyl, 2-cyclopenten-1-yl and phenyl groups. As examples of those having substituent, there are toluyl, xylyl, mesityl, cumyl, benzyl, diphenylmethyl, phenethyl, styryl, etc. As condensed polycyclic hydrocarbon groups, there are naphthyl, anthryl, phenanthryl, 2-indenyl, 1-pyrenyl, etc.

Concrete examples for the above-mentioned electron donor will be mentioned. Ethers include diethyl ether, dipropyl ether, dibutyl ether, diisoamyl ether, ethylene glycol dimethyl ether, diethylene glycol dimethyl ether, diethylene glycol diethyl ether, diphenyl ether, tetrahydrofuran, etc. Esters include ethyl acetate, butyl acetate, amyl acetate, vinyl lactate, vinyl acetate, methyl propionate, methyl benzoate, ethyl benzoate, propyl benzoate, butyl benzoate, octyl benzoate, 2-ethyl-hexyl benzoate, methyl toluylate, ethyl toluylate, butyl toluylate, 2-ethyl-hexyl toluylate, methyl anisate, ethyl anisate, propyl anisate, methyl naphthoate, ethyl naphthoate, propyl naphthoate, butyl naphthoate, 2-ethyl-hexyl naphthoate, etc. Aldehydes include butyraldehyde, propionaldehyde, benzaldehyde. Ketones include methyl ethyl ketone, diethyl ketone, acetylacetone, acetophenone, benzophenone, etc. Carboxylic acids include acetic acid, propionic acid, benzoic acid, etc. Carboxylic anhydrides include acetic anhydride, butyric anhydride, benzoic anhydride etc. Acid amides include formamide, acetamide, benzamide, etc. Amines include methylamine, dimethylamine, trimethylamine, amylamine, aniline, methylaniline, pyridine, etc. Nitriles include acetonitrile, propionitrile, benzonitrile. Phosphines include triethylphosphine, triphenylphosphine, etc. Thioethers include diethylsulfide, diphenylsulfide, etc. As polysiloxane which can be used in admixture with the above-mentioned electron donor, there are dimethylpolysiloxane, methyl hydrogen polysiloxane, methyl ethyl polysiloxane, methyl phenylpolysiloxane, diphenyl polysiloxane, etc.

The transition metal compound employed includes halides, oxyhalides, acetoxyhalides, etc. of Ti or V. For example, titanium tetrachloride, titanium tetrabromide, tetraethoxytitanium, tetrabuthoxytitanium, monochlorotributoxytitanium, dichlorodibuthoxytitanium, trichloromonoethoxytitanium, vanadium tetrachloride, vanadium oxytrichloride, etc. are mentioned.

As for concrete methods for formation reaction of solid product (II), the following embodiments are mentioned:

(1) A solid product (I), an electron donor and a transition metal compound are simultaneously mixed and reacted.

(2) A solid product (I), and an electron donor are mixed and after addition of a transition metal compound, reaction is carried out.

(3) A solid product (I) and a transition metal compound are mixed and after addition of an electron donor, reaction is carried out.

(4) An electron donor and a transition metal compound are mixed and after addition of a solid product (I) to this mixture, reaction is carried out.

Either of the methods can be carried out in the presence or absence of a solvent.

The mixing proportions of solid product (I), an electron donor and a transition metal compound are, to 100 g of the solid product (I), 10-10,000 g preferably 20-5,000 g of the electron donor and 1-1,000 g preferably 10-500 g of the transition metal compound, and to 100 g of the electron donor, 2-2,000 g preferably 5-500 g of the transition metal compound.

It is suitable to carry out mixing at a temperature of $-50°$ C.$-+30°$ C. but mixing at room temperature (about 20° C.) is common. It is preferable to carry out mixing with stirring. After mixing, reaction is carried out with stirring at 30°-300° C. preferably at 50°-200° C. for 10 min. to 30 hours.

When an electron donor and a transition metal compound are mixed and then a solid product (I) is added to this mixture, the mixture of the electron donor with the transition metal compound may be allowed to stand at a temperature of room temperature (ca. 20° C.) to 100° C., preferably 60° C. or lower, for one minute to 5 hours in advance of adding solid product (I).

Employment of solvent is not always necessary in the mixing and reaction of solid product (I), an electron donor and a transition metal compound, but desirable for carrying out uniform reaction. Accordingly, optional or the total components of the above-mentioned may be, in advance, dissolved or dispersed in a solvent, and mixed. As for the total of the amounts of the solvent used, about 10 times or less (by weight) the total of the amounts of the above-mentioned components may be sufficient.

As for the solvent used, aliphatic hydrocarbons such as hexane, heptane, octane, nonane, decane, etc., aromatic hydrocarbons such as benzene, toluene, xylene, ethylbenzene, cumene, etc., halogenated aromatic hydrocarbons such as chlorobenzene, dichlorobenzene, trichlorobenzene, etc., halogenated hydrocarbons such as carbon tetrachloride, chloroform, dichloroethane, trichloroethylene, tetrachloroethylene, carbon tetrabromide, etc. and the like are mentioned.

After completion of the reaction the resulting material is filtered off in a conventional manner and washed with a solvent such as aliphatic hydrocarbons, aromatic hydrocarbons etc. to remove unreacted transition metal compound and electron donor, followed by drying to obtain a solid product (II).

The solid product (II) is then reacted with at least two kinds of transition metal compounds consisting of at least one member selected from the group A consisting of halogen-containing transition metal compounds and at least one member selected from the group B consisting of halogen-free transition metal compounds.

Said halogen-containing transition metal compounds of group (A) include halides, oxyhalides, alkoxyhalides, acetoxyhalides, and the like compounds of titanium or vanadium, for example, titanium tetrachloride, titanium tetrabromide, trichloromonoisopropoxytitanium, dichlorodiisopropoxytitanium, monochlorotriisopropoxytitanium, trichloromonobutyoxytitanium, dichlorodibutoxytitanium, monochlorotributoxytitanium, vanadium tetrachloride, vanadium oxytrichloride, etc. Said halogen-free transition metal compounds of group (B) include alkoxides of titanium or vanadium, for example, tetraalkyl orthotitanates (tetraalkoxytitaniums) such as tetramethyl orthotitanate (tetramethoxytitanium), tetraethyl orthotitanate (tetraethoxytitanium), tetraisopropyl orthotitanate (tetraisopropoxytitanium), tetra-n-butyl orthotitanate (tetra-n-butoxytitanium), etc., and vanadyl trialcoholates such as vanadyl triethylate $(VO(OC_2H_5)_3)$, vanadyl triisopropylate $(VO(OCH(CH_3)_2)_3)$, vanadyl tri-n-butylate $(VO(OC_4H_9)_3)$, etc. As for the compounds of group (B), polytitanic acid esters can be also employed besides the above-mentioned compounds. These esters are expressed by the general formula $RO+Ti(OR)_2—O+_mR$ wherein m represents an integer of 2 or more, preferably 2-10, and R represents an alkyl group, an aryl group or an aralkyl group, but it is unnecessary that all Rs are the same kinds of groups, and the number of carbon atoms is preferably 1-10, although it is not particularly limited thereto. Concretely, methyl polytitanate, ethyl polytitanate, isopropyl polytitanate, n-propyl polytitanate, n-butyl polytitanate, n-hexyl polytitanate, etc. are mentioned. In said general formula, a part of the alkoxy group may be hydroxyl group.

As transition metal compounds to be reacted with a solid product (II), at least one kind is selected from among the (A) group and at least one kind is selected from among the (B) group, but sufficient effectiveness can be attained even when only one kind is selected from each group i.e. 2 kinds in total.

As for concrete methods for reacting a solid product (II) with transition metal compounds selected from the (A) group and the (B) group (these are abbreviated to (A)—TMC and (B)—TMC, respectively, and when two or more kinds of transition metal compounds are selected from one group, it is to be understood that these abbreviations cover all of these selected compounds), there can be mentioned various methods such that:

(1) to a mixture of (A)—TMC and (B)—TMC, a solid product (II) is added and heated:

(2) after mixing a solid product (II) with (A)-TMC, (B)-TMC is added and heated; or (3) (A)-TMC and a solid product (II) are heated and reacted and then (B)-TMC is added and reacted. Any of the reaction methods can be carried out in the presence or absence of solvent. Solvents used are the same as those illustrated above in the formation reaction of solid product (II).

As for the ratio of amounts of (A)-TMC and (B)-TMC employed, (if two kinds or more are selected from among one group, the total amount thereof is referred to), the ratio of the number of transition metal atoms included in (A)-TMC to that in (B)-TMC is in the range of 10/1-1/10 preferably 5/1-1/5. As for the proportion of the solid product (II) to the total weight of the transition metals, 1-1,000 g of the latter to 100 g of the former may be sufficient. Reaction temperature is in the range of 30°-500° C., preferably 50°-300° C. Reaction time is 10 minutes to 50 hours preferably 30 minutes-10 hours. In case where a solvent is employed, 0-1,000 ml based on 100 g of the solid product (II) may be sufficient. Thus a transition metal compound is supported on the solid product (II).

After completion of the reaction, the resulting material is, in a conventional manner, filtered off, and washed with a solvent such as aliphatic hydrocarbons, aromatic hydrocarbons, etc. at room temperature higher or preferably 60° C. or higher to remove unreacted transition metal compounds, followed by drying to obtain a solid product (III).

In the present invention, even if a halogen-containing non-transition metal compound such as $SiCl_4$, $AlCl_3$, etc. is used in place of (A)-TMC or even if a halogen-free, non-transition metal compound such as aluminum triisopropoxide, aluminum tri-n-butoxide, etc. is used in place of (B)-TMC, the effectiveness of high polymerization activity and broad molecular weight distribution as observed in the present invention can not be exhibited.

The solid product (III) is combined with an organoaluminum compound to obtain a polymerization catalyst.

As for the organoaluminum compound, trialkylaluminums such as triethylaluminum, triisobutylaluminum, trihexylaluminum, etc., dialkylaluminum monochlorides such as diethylaluminum monochloride, etc., ethylaluminum sesquichloride, etc., and besides, alkoxyalkylaluminums such as monoethoxydiethylaluminum, diethoxymonoethylaluminum, etc. are mentioned.

Catalyst thus obtained is used for producing α-olefin polymers. As for α-olefin, straight chain monoolefins such as ethylene, propylene, butene-1, hexene-1, octene-1, decene-1, etc., branched chain monoolefins such as 4-methyl-pentene-1, etc., diolefins such as butadiene, etc. are mentioned. The present invention includes not only homopolymerization of these olefins but also copolymerization of two kinds or more of polymerizable α-olefins among the above-mentioned olefins.

The polymerization reaction is carried out usually in a hydrocarbon solvent such as hexane, heptane, octane, etc. It is carried out at a polymerization temperature of 30°-150° C., preferably 60°-120° C. and under a polymerization pressure of the atmospheric pressure to 50 $kg/cm^2$, preferably 5-40 $kg/cm^2$. At the time of polymerization, it is possible to add a proper amount of hydrogen to the polymerization system for adjusting the molecular weight.

A first effectiveness of the present invention is in that olefin polymers having a very broad molecular weight distribution are obtained. Particularly in the case of ethylene polymers, the distribution is 20-25 in terms of $\overline{M}_w/\overline{M}_n$, and at the time of molding of polymers, their flow characteristics are superior, and resin pressure is low and no melt fracture occurs, thus the appearance of the resulting moldings are superior and moldability is stabilized. Further, propylene polymers are characteristic of a high stereoregularily.

A second effectiveness of the present invention is in that the polymerization activity is very high. In the case of ethylene polymers, the polymer yield amounts to 900 in terms of g (polymer)/{solid product (III) g×polymerization time (Hr)×olefin pressure ($kg/cm^2$)} which yield will often be hereinafter abbreviated to Ep. Thus, it is possible to do without step of removal of catalyst remaining in polymer after completion of the reaction, i.e. step of deashing A third effectiveness of the present invention is in that the resulting polymer particle has a very good shape. Whether the shape of the polymer particle is good or not can be judged by measuring the bulk density (which will be hereinafter abbreviated to BD) of polymer particle. The superior shape of polymer particle results in a high production efficiency per unit volume of polymerization vessel per hour, no trouble at the time of transportation of polymer through piping lines and easy granulation of polymer powder. The BD of polymers obtained according to the present invention is in the range of 0.35-0.40 in the case of ethylene polymers and 0.40-0.50 in the case of propylene polymers.

Another effectiveness of the present invention is in that no or very few adhesion of polymer onto the wall surface of polymerization vessel occurs at the time of polymerization, which makes it possible to carry out a continuous polymerization in a stabilized manner for a long time, in a same polymerization vessel.

The present invention will be mentioned by way of Examples.

In the following Examples and Comparative examples, melt index (which will be hereinafter abbreviated to MI) was according to ASTM D-1238(E) and melt flow rate (which will be hereinafter abbreviated to MFR) was according to ASTM D-1238(L). $\overline{M}_w/\overline{M}_n$ (wherein $\overline{M}_w$ represents weight average molecular weight and $\overline{M}_n$ represents number average molecular weight) was sought through gel permeation chromatography (by means of GPC-200 Type made by Waters Company).

EXAMPLE 1

(1) Preparation of solid product (III)

76 Grams of magnesium hydroxide and 90 g of aluminum trichloride (anhydrous) were, in advance, mixed and milled in a vibrating mill for 5 hours and then reacted together at 150° C. for 5 hours, followed by cooling and fine milling to obtain a solid product (I).

100 Grams of titanium tetrachloride was introduced into 100 ml of toluene. While maintaining the mixture at 20° C., 130 g of di-n-butyl ether was added and continuation of mixing with stirring was carried out for 30 minutes. To this toluene solution, 100 g of the above-mentioned solid product (I) was then added, followed by reaction with stirring at 110° C. for 2 hours. After completion of the reaction, filtration was first carried out and the remaining solid product was washed with hexane until unreacted titanium tetrachloride and unreacted ether were not detected in the filtrate, followed by drying in vacuo to obtain a solid product (II).

Next, 87 g of titanium tetrachloride and 65 g of tetraisopropyl orthotitanate in an atomic ratio of transition metals (in terms of the above-mentioned definition) of 2/1 were added to and mixed with 400 ml of toluene and then 100 g of the above-mentioned solid product (II) was added, followed by reaction with stirring at 110° C. for 3 hours. After completion of the reaction, filtration was, in a conventional manner, carried out and washing with hexane was repeated until no titanium compound was detected in the filtrate, followed by drying in vacuo to obtain a solid product (III), which contained 92 mg of titanium atom in 1 g thereof.

(2) Polymerization of ethylene

Into a 10 l stainless steel polymerization vessel purged with nitrogen gas were introduced 7 l of hexane, 397 mg (2 mmol) of triisobutylaluminum and 50 mg of the solid product (III). The polymerization vessel was closed and heated to 80° C., and hydrogen was introduced so as to give a pressure up to 18 Kg/cm$^2$ (gauge). Reaction was carried out at 80° C. for two hour while adding ethylene so as to maintain a total pressure of 35 Kg/cm$^2$ (gauge). After completion of the reaction, the resulting slurry of ethylene polymer was filtered off without deashing and dried to give 1275 g of a white polymer, which had a MI of 0.27, a BD of 0.37, and a $\overline{M}_w/\overline{M}_n$ of 24 and whose Ep (polymer yield) was 850.

COMPARATIVE EXAMPLE 1

The polymerization of Example 1 was repeated except that the solid product (II) was combined with an organoaluminum compound, in place of solid product (III). (As in this case, a solid catalyst component to be combined with an organoaluminum compound and employed for catalyst will be hereinafter referred to as "final solid product" in the following Comparative examples).

COMPARATIVE EXAMPLE 2

Example 1 was repeated except that the solid product (I) was substituted for the solid product (II).

COMPARATIVE EXAMPLE 3

Example 1 was repeated except that when the solid product (II) was prepared in Example 1, no di-n-butylether was employed.

COMPARATIVE EXAMPLE 4

Example 1 was repeated except that when the solid product (II) was prepared in Example 1, no titanium tetrachloride was employed.

COMPARATIVE EXAMPLE 5

Example 1 was repeated except that no tetraisopropyl orthotitanate was employed in Example 1.

COMPARATIVE EXAMPLE 6

Example 1 was repeated except that when the solid product (III) was prepared from the solid product (II) in Example 1, no titanium tetrachloride was employed.

COMPARATIVE EXAMPLE 7

87 Grams of titanium tetrachloride and 65 g of tetraisopropyl orthotitanate were mixed together in 100 ml of toluene and they were reacted at 110° C. for 3 hours, followed by cooling, adding 500 ml of hexane, precipitating a solid product, filtration and drying to obtain a solid product. The polymerization of Example 1 was repeated except that this solid product was employed as a final solid product. The yield of the resulting polymer was much reduced and the shape of the polymer was inferior, and also the amount of polymer which adhered onto the wall of the polymerization vessel was very large.

COMPARATIVE EXAMPLE 8

Example 1 was repeated except that 65 g of tetraisopropyl orthotitanate was replaced by 44 g (equimolecular thereto) of vanadium tetrachloride.

COMPARATIVE EXAMPLE 9

Example 1 was repeated except that 87 g of titanium tetrachloride to be reacted with the solid product (II) was replaced by 156 g (equimolecular thereto) of tetra-n-butyl orthotitanate.

COMPARATIVE EXAMPLE 10

Example 1 was repeated except that a product obtained by combining 25 mg of solid product (II) obtained in Example 1, with 75 mg of solid product obtained in Comparative example 7 was used as a final solid product.

COMPARATIVE EXAMPLE 11

Example 1 was repeated except that titanium tetrachloride to be reacted with the solid product (II) was replaced by 78 g (equimolecular thereto) of silicon tetrachloride (SiCl$_4$).

COMPARATIVE EXAMPLE 12

Comparative example 11 was repeated except that silicon tetrachloride was replaced by 61 g (equimolecular thereto) of aluminum chloride (anhydrous).

COMPARATIVE EXAMPLE 13

Example 1 was repeated except that tetraisopropyl orthotitanate was replaced by 47 g (equimolecular thereto) of aluminum triisopropoxide.

EXAMPLE 2

Seventy five g of magnesium oxide and 80 g of aluminum chloride (anhydrous) were mixed and milled in a ball mill for 24 hours. After heating at 200° C. for 2 hours, cooling and milling were carried out to obtain a solid product (I).

After adding 100 g of the solid product (I) and 60 g of n-butyl acetate to 150 ml of hexane, 100 g of titanium tetrachloride was added and reaction was carried out at 60° C. for 20 hours to obtain a solid product (II).

Then 100 g of the solid product (II), 87 g of titanium tetrachloride and 46 g of isopropyl polytitanate (pentamer) (the atomic ratio of transition metals: 2/1) were added to 400 ml of xylene and reaction was carried out at 110° C. for 3 hours. After completion of reaction, washing with toluene was repeated. After obtaining the solid product (III), ethylene polymerization was carried out as in Example 1.

COMPARATIVE EXAMPLE 14

The polymerization of example 1 was repeated except that the solid product (II) obtained in Example 2 was used in place of the solid product (III) as a final solid product.

COMPARATIVE EXAMPLE 15

Example 2 was repeated except that isopropyl polytitanate was not used.

COMPARATIVE EXAMPLE 16

Example 12 was repeated except that titanium tetrachloride was not used in the production of the solid product (III) from the solid product (II).

COMPARATIVE EXAMPLE 17

In 100 ml of toluene, 87 g of titanium tetrachloride and 46 g of isopropyl polytitanate (pentamer) (atom ratio of transition metals :2/1) were mixed and then reaction was carried out at 110° C. for 2 hours. After lowering temperature down to room temperature, 400 ml of hexane was added and allowed to stand to precipitate a solid product which was filtered off and washed with hexane, followed by drying to give a solid product. By using this material as a final solid product, ethylene polymer was prepared as in Example 1.

COMPARATIVE EXAMPLE 18

Example 1 was repeated except that 25 mg of the solid product (II) obtained in Example 2 and 75 mg of the solid product obtained in Comparative example 17 were combined and used as a final solid product.

COMPARATIVE EXAMPLE 19

Example 2 was repeated except that $TiCl_4$ to be reacted with solid product (II) was replaced by 78 g (equimolecular thereto) of $SiCl_4$.

COMPARATIVE EXAMPLE 20

Example 2 was repeated except that 46 g of aluminum tri-n-butoxide was used in place of isopropyl polytitanate of Example 2.

EXAMPLE 3

Seventy g of ferric chloride (anhydrous) and 65 g of hydromagnesite (3 $MgCO_3.Mg(OH)_2.3H_2O$) were mixed and milled in a vibration mill for 2 hours, and after heating at 300° C. for one hour, cooling and milling were carried out to obtain a solid product (I).

In 100 ml octane, 100 g of the solid product (I), 72 g of n-butyraldehyde and 190 g of vanadium tetrachloride were mixed at the same time and thereafter reaction was carried out at 70° C. for 15 hours and the same subsequent procedure as in Example 1 was carried out to obtain a solid product (II).

Then 100 g of the solid product (II) and 114 g of titanium tetrachloride were introduced in 200 ml of benzene. After reaction was carried out at 78° C. for 3 hours, 58 g of tetrabutylorthotitanate (atom ratio of transition metals:3.5/1) was added and reaction was carried out for another 5 hours at 78° C. to obtain a solid product (III). By using this solid product (III), production of ethylene polymer was carried out as in Example 1.

EXAMPLE 4

One hundred ten g of magnesia cement ($MgCl_2.3MgO.4H_2O$) and 95 g of aluminum chloride (anhydrous) were mixed and milled in a vibration mill for 3 hours and then reaction was carried out at 130° C. for 4 hours to obtain a solid product (I).

In 100 ml of toluene maintained at 20° C., 75 g of propionic acid and 190 g of titanium tetrachloride were mixed, and to the mixture, 100 g of solid product (I) was added to effect reaction at 100° C. for 3 hours. After completion of reaction, a solid product (II) was obtained as in Example 1. Then 127 g of titanium tetrachloride and 81 g of vanadyl triisopropylate [$VO-(OCH(CH_3)_2)_3$] (atom ratio of transition metals:2/1) were mixed in 250 ml of toluene, and 100 g of the above-mentioned solid product (II) was added thereto, followed by reaction at 110° C. for 4 hours to produce a solid product (III).

Employing this solid product (III), ethylene polymer was produced as in Example 1.

EXAMPLE 5

Eighty g of aluminum chloride (anhydrous) and 70 g of hydrotalcite ($Mg_6Al_2(OH)_{16}CO_3.4H_2O$) were mixed and milled in a ball mill for 48 hours and after heated at 120° C. for 4 hours, cooling and milling were carried out to obtain a solid product (I).

To 100 ml of toluene, 60 g of propionitrile, and 180 g of titanium tetrachloride were mixed and after subjected to reaction at 50° C. for 5 minutes, 100 g of the solid product (I) was added and reaction was carried out at 80° C. for 7 hours to obtain a solid product (II).

Then, to 400 ml of xylene, 100 g of the solid product (II) and 69 g of n-butyl polytitanate (dimer) were added and then 96 g of vanadium tetrachloride (atom ratio of transition metals:3/1) was added to effect reaction at 130° C. for 3 hours. Thereafter the preparation of the solid product (III) and production of ethylene polymer were carried out as in Example 1.

EXAMPLE 6

By using the solid product (III) obtained in Example 1 and charging hydrogen up to 10 kg/cm² (gauge pressure), and adding ethylene containing 8% by volume of propylene so as to maintain the total pressure at a gauge pressure of 35 kg/cm² and proceeding as in Example 1 in other points, ethylene-propylene copolymer was prepared. The propylene content in the copolymer was 5.6% by weight.

EXAMPLE 7

Ethylene-butene copolymer was prepared as in Example 1 except that a solid product (III) obtained in Example 1 was used, hydrogen was introduced up to a gauge pressure of 12 kg/cm² and ethylene containing 10% by volume of butene-1 was added in such a way that the total pressure was maintained at 35 kg/cm² gauge. The butene content of the polymer was 5.0% by weight.

The results of the above-mentioned Examples and comparative examples are shown in the following Table.

| Examples or Compar. exs. | Polymer yield (Ep) | Physical properties of polymers | | |
|---|---|---|---|---|
| | | MI | BD | $\overline{M}_w/\overline{M}_n$ |
| Example 1 | 850 | 0.27 | 0.37 | 24 |
| Compar. ex 1 | 1,100 | 12 | 0.40 | 6 |
| Compar. ex 2 | 210 | 0.51 | 0.27 | 19 |
| Compar. ex 3 | 250 | 0.42 | 0.27 | 19 |
| Compar. ex 4 | 200 | 0.30 | 0.29 | 17 |
| Compar. ex 5 | 1,050 | 14 | 0.41 | 5 |
| Compar. ex 6 | 470 | 11 | 0.35 | 6 |
| Compar. ex 7 | 140 | 0.06 | 0.20 | 15 |
| Compar. ex 8 | 1,100 | 1.2 | 0.36 | 13 |
| Compar. ex 9 | 350 | 0.45 | 0.30 | 10 |
| Compar. ex 10 | 740 | 0.93 | 0.28 | 9 |
| Compar. ex 11 | 370 | 0.20 | 0.28 | 16 |
| Compar. ex 12 | 160 | 0.09 | 0.29 | 15 |
| Compar. ex 13 | 410 | 2.3 | 0.30 | 8 |
| Example 2 | 900 | 0.41 | 0.38 | 25 |
| Compar. ex 14 | 1,020 | 15 | 0.40 | 5 |
| Compar. ex 15 | 1,040 | 14 | 0.39 | 5 |
| Compar. ex 16 | 500 | 11 | 0.34 | 6 |
| Compar. ex 17 | 120 | 0.03 | 0.19 | 14 |
| Compar. ex 18 | 760 | 0.79 | 0.28 | 9 |
| Compar. ex 19 | 300 | 0.38 | 0.29 | 16 |
| Compar. ex 20 | 340 | 1.7 | 0.28 | 7 |
| Example 3 | 730 | 0.15 | 0.35 | 21 |
| Example 4 | 770 | 0.56 | 0.36 | 20 |
| Example 5 | 690 | 0.70 | 0.34 | 22 |
| Example 6 | 880 | 0.55 | 0.35 | 22 |
| Example 7 | 860 | 0.46 | 0.35 | 23 |

EXAMPLE 8

By using the solid product (III) obtained in Example 1, polymerization of propylene was carried out. To a 5 l polymerization vessel, 3.5 l of hexane, 210 mg of diethylaluminum chloride, and 50 mg of the solid product (III) were introduced and reaction was carried out at 70° C. for 4 hours under a hydrogen partial pressure of 1 kg/cm² (gauge pressure) and a propylene partial pressure of 10 kg/cm² (gauge pressure).

MFR of the resultant polymer (ASTM-D 1238 (L)) was 3.0, B.D. was 0.41, $\overline{M}_w/\overline{M}_n$ was 9.0, isotactic index (proportion of the extraction residue after extraction of the polymer in boiling n-heptane (at 98° C.) for 4 hours relative to the polymer weight before the extraction) was 0.91 and polymer yield was 5,500 g per 1 g of the solid product (III).

What is claimed is:

1. In a method for producing α-olefin polymers by homopolymerization or copolymerization of α-olefins in the presence of a catalyst obtained by combining a solid product (III) with an organoaluminum compound, the improvement which comprises employing as said solid product (III) a material obtained by (a) obtaining a solid product (I) by reacting (1) a trivalent metal halide selected from the group consisting of anhydrous aluminum chloride and anhydrous ferric chloride, with (2) a divalent metal hydroxide, oxide, carbonate or a composite compound containing a divalent metal hydroxide, oxide or carbonate or a hydrate of a divalent metal compound, the atom ratio of the divalent metal to the trivalent metal being 0.1 to 20, (b) obtaining a solid product (II) by reacting (1) 100 g of said solid product (I) with (2) 1 to 1000 g of a transition metal compound selected from the group consisting of halides, oxyhalides, alcoholates, alkoxyhalides and acetoxyhalides of a transition metal selected from the group consisting of titanium and vanadium said reaction being carried out in the presence of 10 to 10,000 g of an electron donor selected from the group consisting of ethers, esters, aldehydes, ketones, carboxylic acids, acid anhydrides, acid amides, amines, nitriles, phosphines, phosphorus oxytrichloride and thioethers, in a proportion of 2 to 2,000 g of said transition metal compound relative to 100 g of said electron donor to produce a solid product (II), said reaction being carried out by mixing said solid product (I), said transition metal compound and said electron donor and then heating the mixture at 50° C. to 300° C., (c) reacting said solid product (II) with at least two kinds of transition metal compounds consisting of (1) at least one halogen-containing transition metal compound selected from the group consisting of the halides, oxyhalides, alkoxyhalides and acetoxyhalides of titanium or vanadium and (2) at least one halogen-free transition metal compound selected from the group consisting of tetraalkyl orthotitanates (tetraalkoxytitaniums), vanadyl trialcoholates and polytitanic acid esters expressed by by the general formula RO+Ti(OR)₂]$_{\overline{m}}$R wherein m is an integer of 2 or more and the Rs are the same or different kinds of alkyl groups, aryl groups or aralkyl groups, the ratio of the number of transition metal atoms of (c)(1) to the number of transition metal atoms of (c)(2) being between 10:1 and 1:10, the total weight of (C)(1) and (C)(2) being between 1 and 1000 g for each 100 g of said solid product (II), thereby producing a solid product (III).

2. A method according to claim 1 wherein said electron donor is a compound selected from the group consisting of ethers, esters, aldehydes, carboxylic acids and nitriles.

* * * * *